June 8, 1965  R. V. SPALDING  3,187,915
SELF-LOADING MEANS FOR EXCAVATORS, SCRAPERS, SCOOPS
AND THE LIKE
Filed Dec. 7, 1961  5 Sheets-Sheet 1
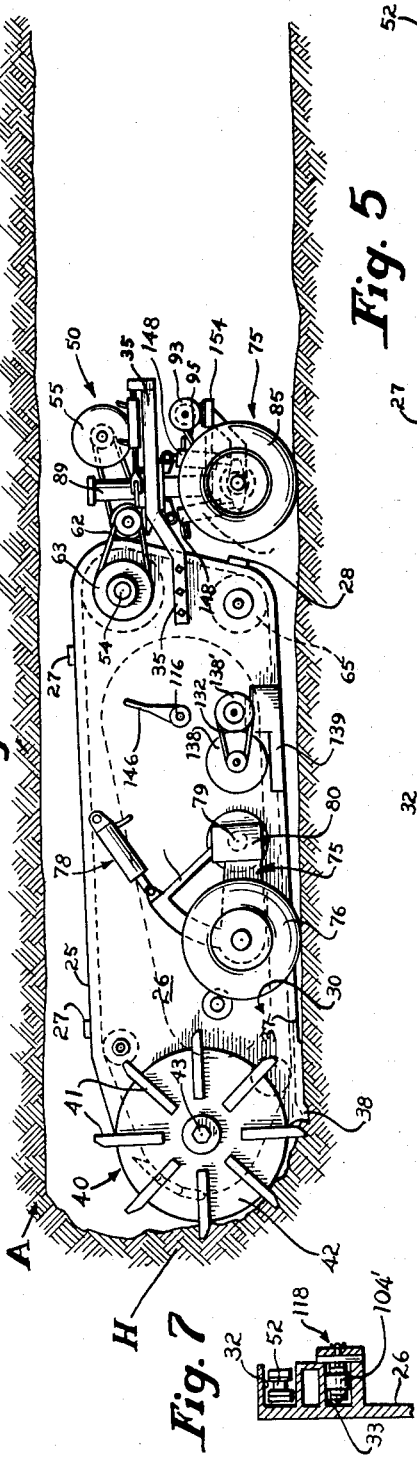
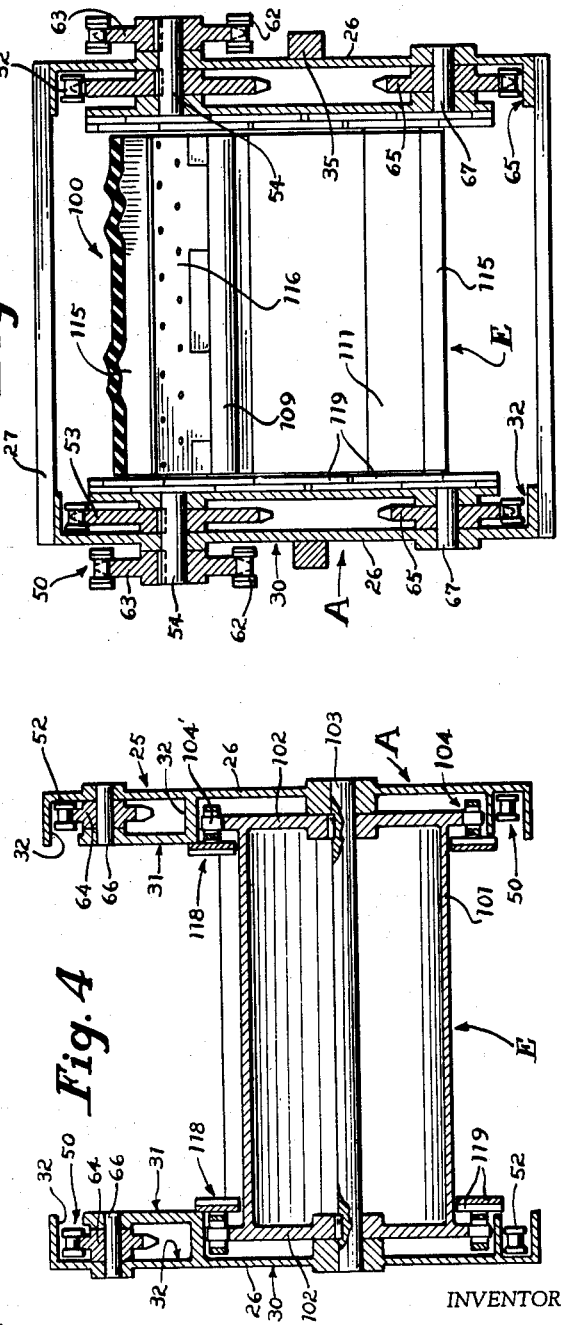
INVENTOR
ROBERT V. SPALDING
BY
ATTORNEYS

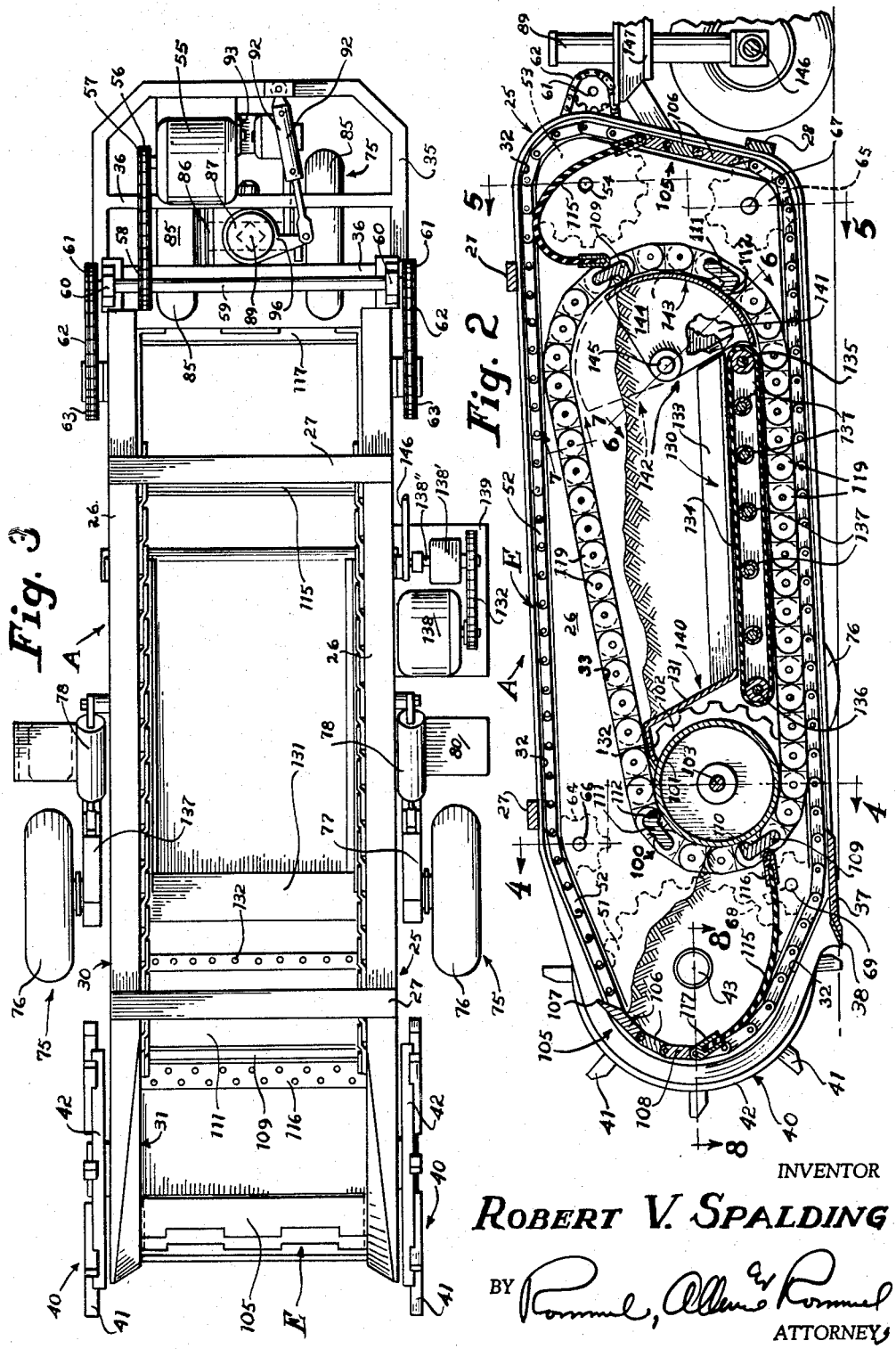

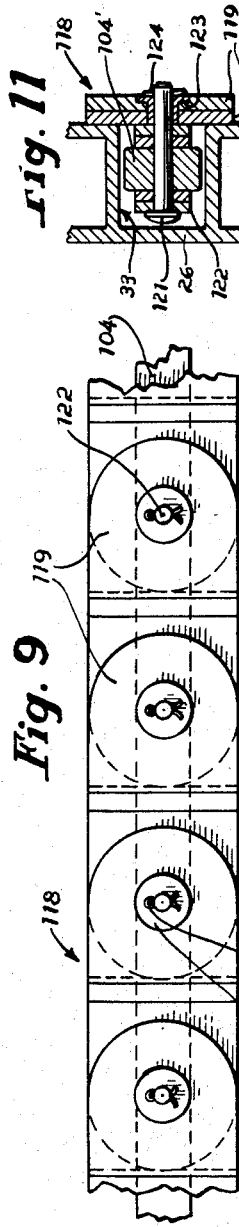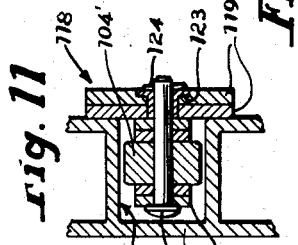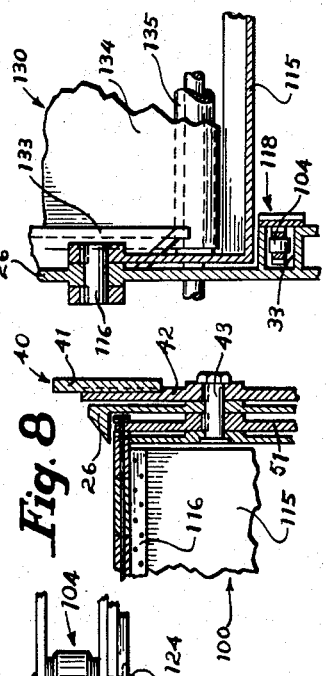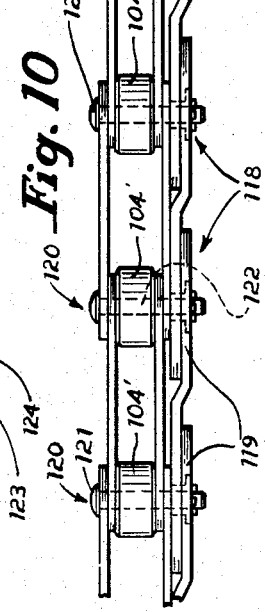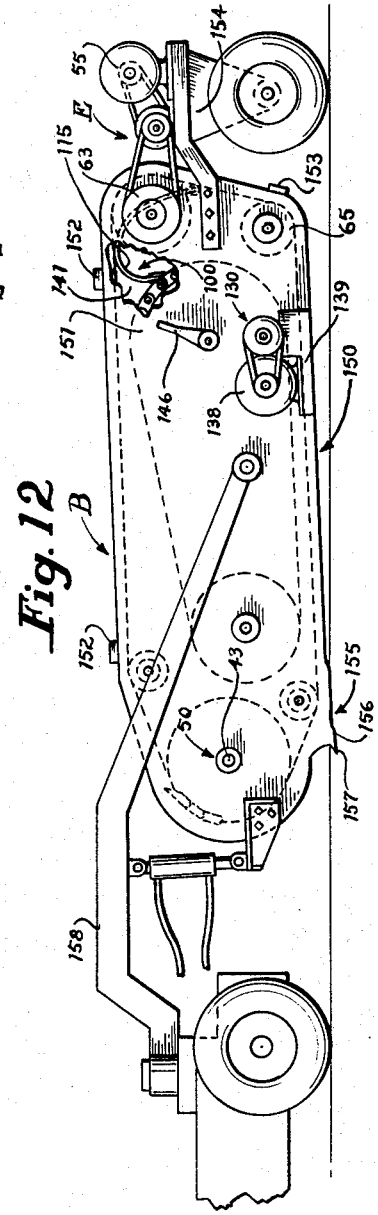

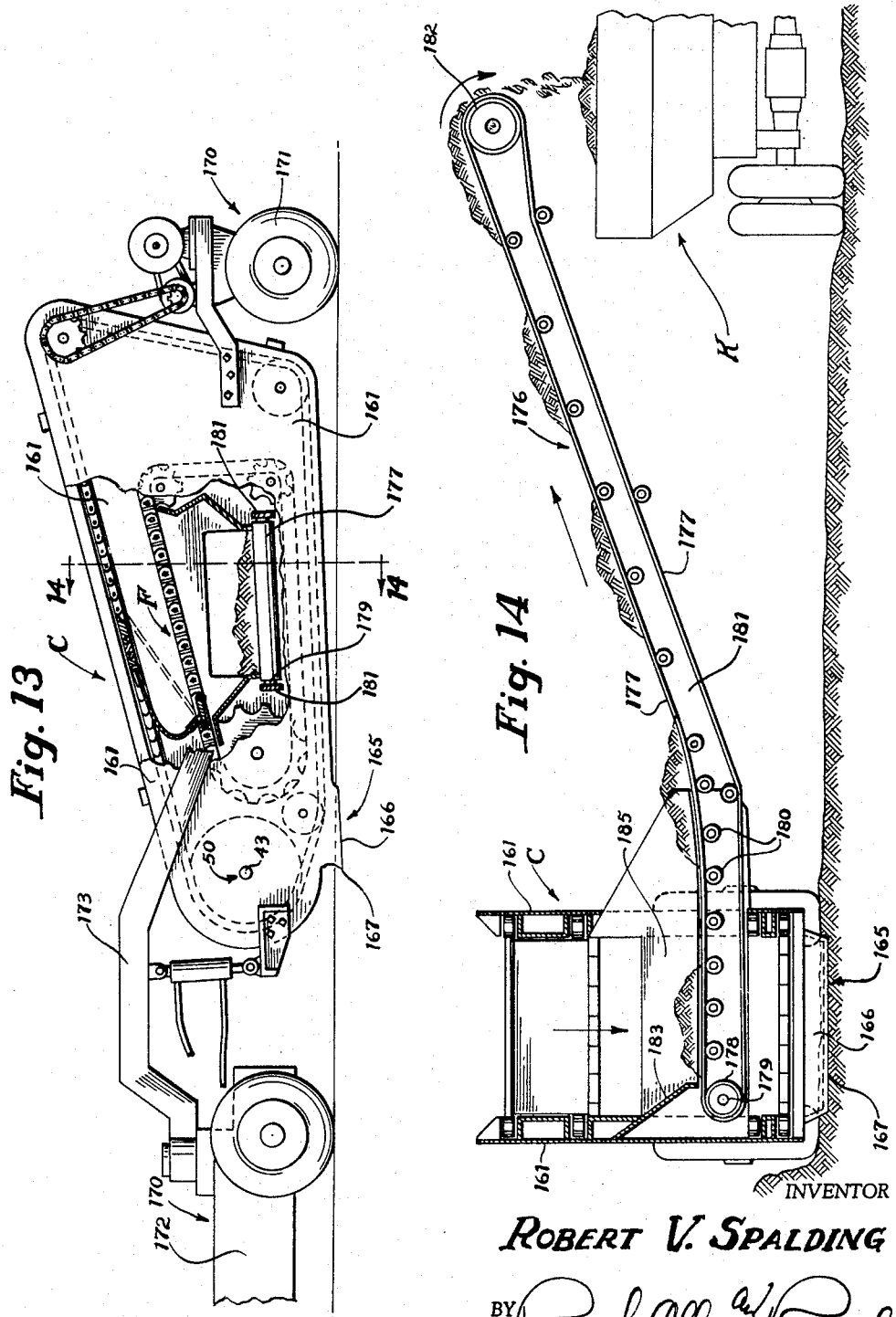

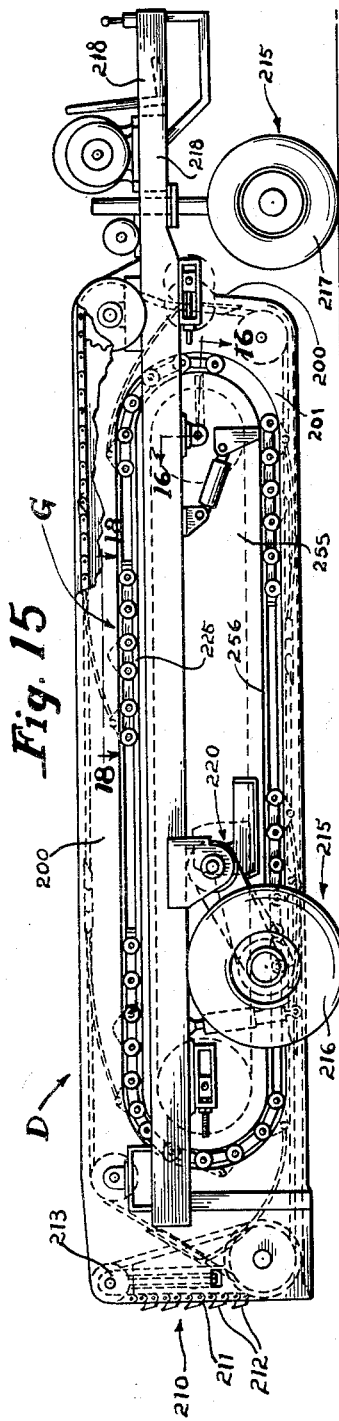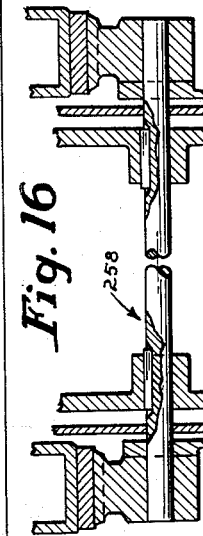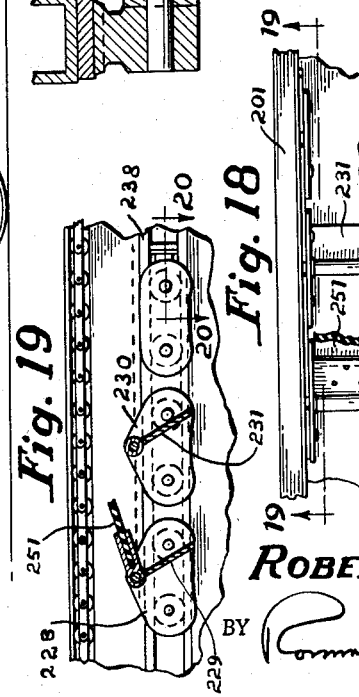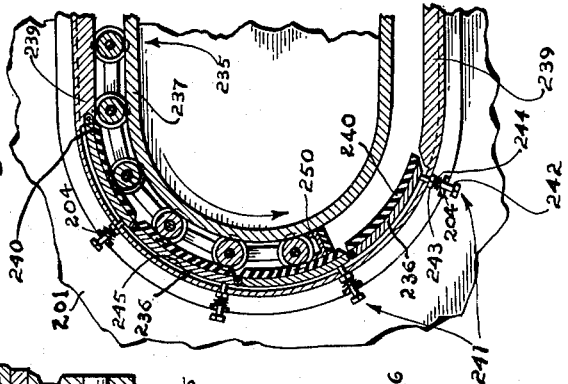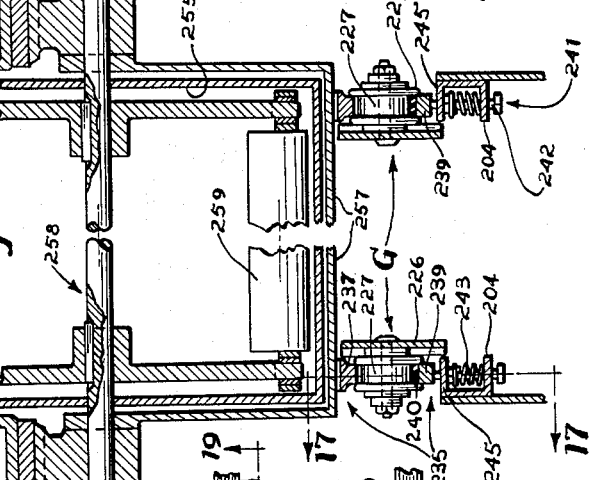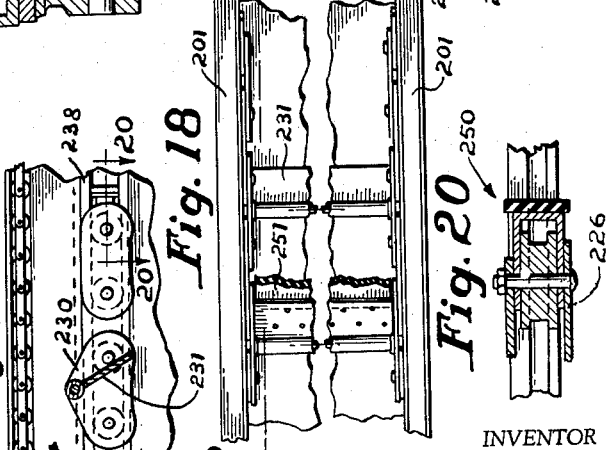

United States Patent Office 3,187,915
Patented June 8, 1965

3,187,915
SELF-LOADING MEANS FOR EXCAVATORS, SCRAPERS, SCOOPS AND THE LIKE
Robert V. Spalding, Salt Lake City, Utah
(26 Lafayette St., Cornwall on the Hudson, N.Y.)
Filed Dec. 7, 1961, Ser. No. 157,801
9 Claims. (Cl. 214—518)

This invention is related to the self-loading means of machines and apparatus such as excavators, scrapers and scoops, for example.

An important object of the invention is to provide self-loading means for cooperation with machines and apparatus such as excavators, scrapers, scoops and the like, which means is built into the housing or frame of the machine or apparatus, for the purpose of conveying the material, removed by the material-removing means of the machine or apparatus, into the same, then dumping and storing the material in the housing or frame for subsequent discharge of the material, as a load, from the machine or apparatus at a location near or remote from the scene of the material-removing operation. For example, the material-removing operation may be in a tunnel and the machine or apparatus, when loaded, may back out of the tunnel and discharge the load.

Another important object is to provide self-loading means as described above which is compact and adapted to be housed in machines or apparatus operating in excavations for example, where there is not sufficient head or other room for auxiliary machines or apparatus or vehicles drawn up alongside to move excavated material from the excavating machines or apparatus to exterior of the excavation.

Still another important object is to provide self-loading means as described, which is of rugged design but in which the movements of parts thereof are relatively simple, so that space is conserved and mechanical upkeep is reduced.

In addition an important object is to provide such self-loading means in which parts thereof have plural functions, thus reducing the number and cost of parts.

Also, an important object is to provide means to bar the movement of removed material (while passing through the machine, upon operation of the self-loading means) into such parts thereof as conveyor chains, raceways therefor and the like.

A further important object is to provide self-loading means which, while not employed to store the removed material-removing machine, until a load is accumulated, does self-load the material in an expeditious manner and conveys it to a discharge port in such a way that the operation is continuous and steady.

Yet another important object is to provide self-loading means which is adapted to handle scraped or scooped material, removed by machines or apparatus which are pulled as well as pushed.

Another important object is to provide self-loading means which permits a much larger range of material size to be loaded and the backward range of material movement is governed simply by the design limits of the machine or apparatus and would not be dependent upon the natural angle of repose of the material loaded.

In addition an important object of the invention is to provide self-loading means for a large-production capacity horizontally-disposed machine or apparatus in which it is housed and which means includes more than, for example, two conveyor flights, associated with flight belts and segmental conveyor chains in place of conventional conveyor chains.

Other objects and advantages of the invention will be apparent during the course of the following detailed description of the invention, taken in connection with the accompanying drawings, forming portions of this disclosure, and in which drawings:

FIG. 1 is a side elevational view of an example of an excavating machine equipped with an example of the self-loading means of this invention, with the machine in operation.

FIG. 2 is a vertical longitudinal sectional view of the machine of FIG. 1 and of the self-loading means thereof, on an enlarged scale.

FIG. 3 is a top plan view of the machine and self-loading means of FIGS. 1 and 2.

FIGS. 4 to 6 inclusive are fragmentary sectional views, substantially on their respective lines of FIG. 2.

FIG. 7 is a fragmentary sectional view of chain races, with chains therein, and movable barrier members for closing the mouths of the races.

FIG. 8 is a fragmentary sectional view, substantially on the line 8—8 of FIG. 2.

FIG. 9 is an elevational view, on an enlarged scale, of several of the barrier members of FIG. 7.

FIG. 10 is a top plan view of the showing in FIG. 9.

FIG. 11 is a longitudinal sectional view through two of the barrier members associated with a raceway.

FIG. 12 is a side elevational view of a scraper containing self-loading means of this invention.

FIG. 13 is a side elevational view of a modified form of machine containing a self-loading means of this invention.

FIG. 14 is a vertical section view of the machine and self-loading means of FIG. 13 in a discharging operation, on line 14—14 of FIG. 13.

FIG. 15 is a side elevational view of another modification of an excavating machine in operation and containing an embodiment of the self-loading means of this invention.

FIGS. 16 and 18 are sectional views substantially on their respective lines of FIG. 15.

FIG. 17 is a sectional view substantially on the line 17—17 of FIG. 16.

FIG. 19 is a sectional view substantially on the line 19—19 of FIG. 18.

FIG. 20 is a sectional view substantially on the line 20—20 of FIG. 19.

In the drawings, wherein for the purpose of illustration are shown a plurality of embodiments of the invention, the letters A, B, C and D designate various types of machines or apparatus adapted to contain self-loading means of this invention, designated respectively as E, F and G, the letters H and L material to be removed by the machines, and K a vehicle for receiving removed material from the machine C.

The machine A comprises an enclosing structure or frame 25; material removing means 40 carried thereby; drive means 50 for the means 40 and for the conveying and initial discharge means 100 of the self-loading means E, the means 50 being carried by the frame 25; and mobile means 75 supporting the frame 25 and means 40, 50 and 100.

The enclosing structure or frame 25 comprises two spaced-apart, substantially parallel longitudinal structural side wall members 26, facing one another, connected, as by welds, with transverse structural members, such as the upper members 27 and lower member 28, although the walls 26 are also connected, as by welds, with another lower transverse structural member 37 to be later described, and it has dual functions.

Each of the members 26 has an outer face 30 and inner face 31. Extending from the faces 31, into the walls of the members 26 are elongate continuous guard and guide slots 32, for the accommodation of portions of the drive means 50, and elongate continuous guard slots or raceways 33 for portions of the means 100. The members 26 are also provided with suitable openings to receive and support shafts and bearings, and also provided with a suitable removed material discharge mouth or opening 141 to be later described.

Also forming a part of the enclosing structure or frame 25 is a support structure 35 which extends substantially horizontally rearwardly from the rear ends of the members 26. The structure 35 preferably comprises a yoke, with the arms thereof secured to the members 26, and cross members or braces 36 fixedly secured to the yoke. This support structure is provided for the accommodation of portions of the drive means 50 and of the mobile means 75, as will be later described.

In addition, the frame 25 includes a lower transverse structural member 37 rearwardly of the front end of the machine A and which member 37 operatively supports a blade 38 forming a part of the material-removing means 40 and which blade extends transversely of the machine, with its forwardly-projecting edge adapted to scrape over the bottom of an excavation or bed, for example, in order to gather up loose material and thus prevent it from lodging beneath the machine and out of the range of the bite.

In addition to the blade 38, the material removing means 40, shown in FIGS. 1, 2 and 3, includes a plurality of spaced-apart excavator teeth 41, preferably extending radially from and, with their outer end portions, beyond excavator wheels 42 to preferably the outer faces thereof to which the teeth are affixed. The wheels 42 are mounted for rotation at the outer faces 30 of the members 26 at the forward or front end of the machine A and are secured, as by keys or splines, to the outwardly-extending end portions of stub shafts 43, which are mounted for rotation in conventional bearings, carried by the members 26. The inwardly-extending portions of the shafts 43 are rigidly secured, as by keys or splines to driven sprocket wheels 51 of the drive means 50 now to be described.

The drive means 50 for the material removing means 40 and the conveying and initial discharge means 100, includes, in addition to the driven sprocket wheels 51, sprocket chains 52 trained thereon, and which are also trained upon drive sprocket wheels 53 carried at the rear end of the machine A and fixedly mounted, as by splines or keys, upon stub shafts 54 carried in conventional bearings which are, in turn, carried by the members 26.

In addition, the drive means 50 includes a motor, such as an electric motor 55, which is preferably fixedly mounted upon the support structure 35. Rotatably connected with the drive shaft of the electric motor is a conventional operative connection 56, such as a chain or belt, between a wheel 57, fixedly mounted on the drive shaft of the electric motor 55, and a wheel 58, fixedly mounted on an intermediate portion of a jack shaft 59 which extends transversely of the machine A and is rotable in bearings 60, carried by the support structure 35. Fixedly mounted upon the end portions of the jack shaft are two drive sprocket wheels 61, over which are trained drive sprocket chains 62 which are also trained over driven sprocket wheels 63 fixedly secured to the stub shafts 54 upon which the drive sprocket wheels 53 are also fixedly mounted. Keys or splines may be employed to fixedly secure these various wheels to their shafts.

As portions of the drive means 50 are a suitable number of guide sprocket wheels, in mesh with the chains 52, such as the wheels 64, 65 and 68, and which are rotatably mounted upon stub shafts 66, 67 and 69 and, in turn, fixedly carried by the members 26, and may be positioned substantially as in FIG. 2, where one of each is shown, and in FIGS. 4 and 5, where two of each of the wheels 64 and 65 are shown in slots 32 to mesh with the chains 52.

The mobile means 75, which also include means for steering of the machine A, may be of any approved kind. For example, for the forward or front end portion of the machine, I may provide a pair of conventional ground wheels 76, rotatably supported by brackets or carriages 77 which are, in turn pivotally supported by the members 26, as by pivot members 79, and which ground wheels may be raised or lowered in any approved way, such as by conventional single-acting ram means 78, with the ram cylinders thereof pivotally attached at one end of each of the members 26 and the outer ends of the piston rods thereof pivotally attached to the brackets or carriage 77 at points remote from the pivot members 79, and which ram means operates conventionally, as is well known in that art. Rotation of the wheels 76 may be effected by two conventional reversible electric motors 80, supported by the carriages 77 and operatively connected with the wheels 76 by belts for rotation thereof, either clockwise or counter-clockwise.

At the rear end portion of the machine A, the mobile means 75 may also include a pair of second ground wheels 85, carried by conventional axle assemblies 86, above which is a support and pivot collars bearing 87, and to the outer end portion of an arm extending rigidly from a collar 96, rigidly attached to the bearing 87, is the outer end of the piston of a conventional double-acting ram 92. The cylinder of the ram 92 is pivotally supported by the support structure 35. Electric motors 93, with suitable drive linkage assemblies 95, may be provided for rotation of the wheels 85.

The self-loading means E associated with the machine A comprises removed material conveying and discharge means 100, discharged removed material receiving means 130, and discharged material load compartment 140.

The removed material conveying and discharge means 100 is carried by the machine A and receives the removed material from the means 40, conveys it to and drops it upon the means 130, being aided in its operation by portions of the drive means 50. Included in the means 100 is an elongate pulley 101 preferably having a periphery spaced an equal distance throughout from its axis of rotation and being rotatably supported upon a shaft 103 carried in conventional bearings mounted in the member 26. The pulley 101 is disposed across the machine A from closely adjacent one member 26 to closely adjacent the other member 26, at the forward end portion of the machine and relatively low down, substantially as may be seen in FIG. 2.

Preferably integral with the pulley 101 are two sprocket wheels 102 at the end portions thereof with their relatively large teeth extending outwardly of the periphery of the pulley, and adapted to mesh with two endless industrial conveyor chains 104. The rollers 104' of the chains are relatively large as may be appreciated from FIGS. 10 and 11, and, consequently, the valleys between the sprocket wheel teeth are correspondingly wide. The reason for the rollers 104' will be explained later. The chains 104 are confined in the guard slots or raceways 33 of the members 26, (FIG. 11, for example). The chain extend rearwardly through the machine A, including the rear portion thereof, where the chains are slidably confined in the curved portions of the slots or raceways 33 (FIG. 2).

In the example shown in the self-loading means E, I have included three different flight means. First, main flight means 105, substantially like the flight means disclosed in my co-pending application Serial No. 97,406, filed February 21, 1961, for Excavating Machines now matured into Patent 3,049,823. There are shown, by way of example, two of the means 105, each comprising an assembly of substantially flat flight sections 106, each extending across the space between the members 26 and pivotally secured together at their longitudinal edges. There is a leading flight section having a forward cutting edge 107 and a trailing flight section 108. These flight sections are supported, at their end edge portions by the sprocket chains 52.

In addition, second flight means 109 (each of which has additional functions, as will be explained later) are provided and each comprising a flight member, substantially L-shaped in transverse section, as shown in FIG.

2, where two are shown employed, which extend across the machine A, with their opposite end portions attached to the chains 104 as an integral part of the chain linkages. Each has a leading edge lip 110 adapted to make rubbing contact with the periphery of the pulley 101, inwardly of the sprocket wheels 102, as the L-shaped flight member travels over the periphery of the pulley. Of course, the flight means 105 and 109 function as flight drags to urge removed material towards the rear portion of the machine A, during the means' rearward movements. The means 109 also function as means to attach one end portion of each of a plurality of flexible flight belts 115, to the chains 104, since each L-shaped flight member carries a half hinge or leaf 116, pivoted at one end portion to the body of the L-shaped flight member intermediate the ends of the latter, and with its other end portion provided with means to rigidly secure the one end portion mentioned above of each flight belt 115. The last-named means may be gripping jaws. Of course, the lips 110 also prevent removed material from falling over the periphery of the pulley 101 and dropping out of the machine, rather than dropping upon the means 130.

Third flight means 111, somewhat like the means 109 in shape and each including a leading edge lip 112, are provided and these are spaced between adjacent flight means 109 and function as drag flights to urge removed material toward the rear of the machine A, as do the other flight means, but the bodies of the flight means 111 function as spreader bars between the chains 104 to retain the latter in operative positions within the slots or raceways 33.

Additional portions of the means 100 include a plurality (two, in the example shown in FIG. 2) of flexible flight belts 115, which provide means for scooping up and retaining removed material, as the same enters the machine A between the wheels 42, and moving it upwardly and over the rear portion of the pulley 101, as the flights travel rearwardly. Each flexible flight belt extends across the machine and has one end portion (trailing end portion) secured to the half-hinge or leaf 116 carried by the flight means 109, and its other end portion secured to a half-hinge or leaf 117 hingedly connected to a trailing flight section 108 of a main flight means 105. Flexible flight belts are also provided for the Excavating Machines of my co-pending application referred to above. These belts 115, due to their inherent flexibility, can assume various shapes, since they can form baskets or pockets (as does the flexible flight belt 115 in the left-hand portion of the machine A of FIG. 2), or the step positions in the right-hand portion of the same machine of FIG. 2, where the belt is beginning to fold so as to pass longitudinally across the bottom portion of the machine, as it also folds when passing over the high point of its travel rearwardly as in FIG. 2.

Also forming parts of the means 100 of the self-loading means E, are a plurality of barrier means 118 best shown in FIGS. 9, 10 and 11, comprising a plurality of overlapping members 119, connected together at the end portions thereof as by pivot pins 120, which also connect the members 119 to the chains 104, the pins 120 having head portions 121 and their shanks 122 extending through suitable bearings 123 carried by the members 119 substantially as shown in FIG. 11, with the free ends of the shanks having transversely extending perforations therethrough for the reception of stops, such as cotter pins 124. The members 119 are stepped at their central transverse axes, as may be appreciated from FIG. 10, and have rounded leading and trailing edges. The members 119 may be of erosion-resistant steel or elastic material, such as web-reinforced rubber, or plastic material. As they are attached to the chains 104 in continuous overlapping arrangements, they provide articulated endless barriers against excavated material gaining entrance into the slots or raceways 33, since they cover the mouths of the slots or raceways 33, as may be seen in FIG. 11. If desired, the barrier means 118 may also be applied to the chains 52, being attached to the links thereof in a manner similar to that of the attachments of the members 118 to the links of the chains 74, since both chains are conventional conveyor chains.

Since the pivot pins 120 extend through the rollers 104' the latter, for purposes of strength are enlarged in diameter.

As for the discharged material receiving means 130, this means functions as a storage means for removed material until preferably a load is obtained and then the load is discharged from the machine A. This means 130 includes a partition wall member 131, extending transversely across the machine A and may be fixedly secured, as by welds, to the members 26. The upper end portion of the wall 131 has a horizontally-disposed flange, integral therewith, which extends towards the forward end of the machine A and fixedly supports, upon its upper surface, a scraper guard 132 projecting somewhat beyond the edge of the flange and adapted to contact the periphery of the roller 101 in order to scrape it free of removed material. This guard may be of web-reinforced rubber material, such as belting. The wall 131 preferably projects, from its flange, rearwardly and downwardly. In addition to this wall 131, I prefer to provide false walls or troughing members 133 carried by the walls 26 and extending downwardly and inwardly of the walls 26 to the edges of the upper run of an endless conveyor 134, which run moves rearwardly from a location preferably slightly to the left (as in FIG. 2) of the bottom edge of the partition wall 131.

The endless conveyor 134 may be a belt or conveyor chains-and-apron assembly and trained about suitable rotatable members, as a head member 135 (being a head pulley or sprocket wheel assembly) and a tail member 136 (such as a tail pulley or sprocket wheel assembly), with a suitable number of spaced-apart rollers or pulleys 137 adapted as supports for the upper run of the conveyor. The members 135 and 136 and pulleys or rollers 137 are preferably supported on shafts carried by the members 26 with one of the members (as the member 136) which is keyed or splined to its shaft and the latter rotated as by a suitable drive means between it and a motor, such as the electric motor 138, which may be supported upon a bracket 139 carried by a member 26. The conveyor member 136 rotates clockwise.

The load compartment 140 (wherein removed material may be stored until discharged from the machine A through the discharge opening 141 in one of the walls 26) may be defined by the false walls or troughing members 133, the partition wall 131, the upper run of the endless conveyor 134 and a gate 142 adapted to close or open the discharge opening 141. This gate 142 preferably comprises a curved wall 143 facing the rear end of the machine A and extending across the machine from the rear side edges of the false walls or troughing members 133, and provided with wings 144 fixedly secured to the wall 143 and with one adapted to close the opening 141. The wings 141 are preferably provided with outwardly pins 145 secured thereto and rotatable in the members 26 with at least one pin projecting outwardly of a member 26 and provided with means to effect rotation of the pins. Such means may be a lever 146 or the like.

In operation the front or excavating end of the machine A is lowered to a suitable height, by means of the rams 78, for example, and thrust horizontally or at a moderate incline into the material H to be removed. Prior to these operations, the drive motor 55 has been energized and the flight means 105, 109 and 111 are moving around the peripheries of their paths as defined by the course of chains 52 passing around their respective sprocket wheels. During the intervals between the passing of the flight assemblies around sprocket wheels, the excavator teeth 41 provide a digging action cycle which, coupled with thrust of the machine, bring material H into the bite between the wall members 26. One flight assembly now advances towards the head and excavation end of the machine, engages with sprocket wheels 51 and is pulled through the material and upwardly. As this flight assembly moves upwardly around the sprocket wheels the removed material is held in the basket formed by the flexible flight belt 115 and as the flight assembly continues backwardly towards the sprocket wheel 53, the material is rolled towards the pulley 101 and, upon continued travel, the material is confined and pulled up over the pulley and backwardly over the lip of the partition wall 131, and falls or is pulled into load compartment 140. When the belts 115 are in substantially taut and straight positions the removed material is discharged into the load compartment, and the flight belts double up, moving longitudinally along the lower portion of the machine until they are again in excavated material scooping and carrying positions.

Upon completion of taking in a load of excavated material, the excavator drive is stopped, with the flight assemblies positioned in their respective positions as shown in FIG. 2. The machine is then moved, under its own power, to a discharge station and, after opening the gate 142 the final discharge means 134 is put into operation and the load subsequently discharged.

The substantially L-shaped flight member 109, have been discovered to function well to prevent excavated material from falling from the end portions of the flexible flight belts 115 and their lips, engaging the periphery of the pulley 101, operate as flight drags to move excavated material toward the back end of the material compartment, while the secondary flight members 111 function both as spreader bars between the chains 174 in order to hold them in proper positions, and as drag flights also to carry material toward the back of the compartment 140.

The guard lip or scraper 132, projecting rearwardly at the upper end of the wall 131 with the flange, keeps the pulley 101 free of excavated material as its periphery moves past the lip or guard, and it also tends to cause the removed material, while being dumped, to take a course which will cause it to slide down the partition wall 131 and not drop between that wall and the pulley 101.

FIG. 12 discloses an adaptation of the self-loading means E to a machine B, such as a scraper. Here the machine B is provided with a frame 150, material removing means 153, carried by the frame, mobile means for supporting and permitting transportation of the machine B from place to place, and drive means 158 for the mobile means which drive means may be a tractor.

The frame 150 includes substantially parallel structural side frame wall members 151 which may be rigidly joined together by suitable structural upper transverse members 152 and lower transverse members 153, with the wall members 151 provided with guide slots similar to the guide and guard slots 32 and raceways similar to the raceways 33 of the frame 25 of the machine A. The wall members 151 are also provided with suitable openings for bearings, shafts and the like substantially similar to the openings in the wall members 25 for the removed material conveying and discharge means 100 of the self-loading means E and final discharge material receiving means 130. One of the wall members 151 is also provided with a discharge opening substantially like the opening 141 of the machine A.

In place of the material removing means 40 as exemplified in the machine A, the means 155 for removing material, on the machine B, is a scraper 156, with its forward edge 157 adapted to engage the material to be removed and, with the forward movement of the machine, cause the material to slide rearwardly upon the upper face of the scraper, whereupon the removed material is taken up by the means E as in the machine A.

Since the material removing means for the machine B is preferably stationary, no drive means, insofar as drive means for that purpose, is included, but drive means for the removed material conveying and discharge means of the self-loading means for machine B is needed, preferably the only omission in the drive means for the removed material conveying and discharge means in machine B are the outward end portions of the shafts 43 of the drive means 50. Otherwise all the elements of the self-loading means E as described are applicable to machine B.

The self-loading means E, of the machine A, is applicable for incorporation in a machine or apparatus, which is adapted to move forwardly and remove material for discharge into or upon a suitable carrier K, as a vehicle, a conveyor or the like, disposed at one side of the machine. Such a machine C is illustrated in FIGS. 13 and 14.

This machine C includes a frame 160 material removing means 165, mobile means 170, and self-loading means 175 for the removed material.

The frame 160 comprises two structural side frame wall members 161, preferably extending upwardly toward the rear portion of the machine, and connected by suitable cross members. The members 161 are provided with elongated guard and guide slots and elongated guide slots or raceways substantially similar to the slots and raceways 32 and 33, necessary openings for bearings and shafts and a discharge opening 163 in one of the members 161. Like the machine B, the material removing means 165, comprising a scraper 166 with forward edge 167 adapted to engage the material to be removed as the machine C moves forwardly, operates in a manner which may be substantially similar to the means 155. Consequently, the drive means 50 omits the outward end portions of the shafts 43 thereof. Mobile means 170 in addition to conventional rear ground wheels 171 may include a conventional tractor, designated generally as 172 operatively connected to the frame 160 as by a conventional hitch 173.

The self-loading means F for the machine C is preferably substantially like the means E except for the discharged material receiving means. This means 175 for the machine C includes a laterally-movable endless conveyor 176 in place of the longitudinally-movable conveyor 134. This endless conveyor 176 includes a conveyor belt 177, the upper run of which forms the bottom of the load compartment 185. The conveyor belt 177 extends over a suitable pulley 178 carried by a shaft 178 rotated by any approved means, as an electric motor like the electric motor 138 but disposed so that its drive shaft and a suitable belt in operative connection therewith and with the pulley 177 will rotate the latter. A plurality of rollers 180 support and guide the upper run of the conveyor belt 177 and are journalled in two substantially parallel and facing spaced apart elongate brackets 181 supported by one of the members 161 and which extend upwardly and outwardly with a pulley 182 carried at the upper or outer end of the conveyor 175 over which the belt 177 is trained.

It will be noted, in FIG. 14 that but one false wall or troughing member 183 is required. Removed material, discharged into the load compartment 185 will move to the right as viewed in FIG. 14, then up the incline of the conveyor 175 and be discharged into the vehicle K, drawn up alongside.

The machine D of FIGS. 15–20, inclusive, is illustrated as one adapted for high production capacity purposes, and has a frame 200, excavating means 210, carried by the frame, mobile means 215 for supporting and permitting transportation of the machine from place to place, and drive means 220 for the mobile means 215, carried by the frame.

The frame 200 includes spaced-apart, substantially parallel, structural side frame wall members 201, which may be secured together by suitable transverse structural members, rigidly secured to the members 201 and may be substantially similar to the transverse members 27 and 28 of the frame 25 of the machine A. The members 201 are provided with guide slots and raceways substantially similar to the guide slots 32 and raceways 33 of the frame 25 of the machine A, suitable openings to accommodate shafts for the means G, and one of the wall members 201 is provided with a discharge opening substantially like the opening 119 on one of the frame members 26. Differing from the machines A and B, the machine D is provided with a lateral extension of the wall members and bridging the same, and a plurality of preferably angle-iron supports 204 (FIGS. 16–17) carried by the members 201, for rails 239, rail segments 238 and brake means to be subsequently described.

The material removing or excavating means 210 preferably differs from the excavating means heretofore described in that there may be provided a conventional belt chain cutting and excavating assembly in which the belt 211 is sufficiently wide enough so that material (for example, coal or soft rock) would be gathered from a path substantially equal in width to that of the machine D, and the belt be adapted to mount a plurality of staggered excavating or cutting teeth 212 adapted to pass material towards the center of the machine, with the belt trained on suitable rotatable members 213 carried by the members 201.

The mobile means 215 may be of any approved kind. I have illustrated a plurality of pairs of ground wheels 216 and 217, rotatably supported by the frame 200, substantially as are the ground wheels 76 and by way of a yoke 218 fixedly secured by the wall members 201 and projecting rearwardly thereof.

The drive means 220 for the mobile means 215 may be substantially similar to the drive means for the machine B.

Referring now to the self-loading means G of the machine D, this means differs from the means E and F, first as to the conveying and discharge means 225 for the removed material, there is provided, in lieu of the endless conveyor chains 100, segments comprising a plurality of hinged apron assemblies 226 carried on double-flanged wheels 227. Mounted between the trailing segments 228 of the apron assemblies is a first transverse flight plate member 229, and, fixedly mounted between opposite intermediate segments 230 of the apron assemblies 226 are a second transverse flight plate members 231.

Means 235 is provided for defining or guiding the course or path of travel of the hinged apron assemblies 226, as they are pulled through the excavation cycle, up over a load compartment through a discharge cycle and back under the load compartment towards the start of the excavation cycle. The means 235 comprise two sets each of outer rails 239 and inner rails 237, with the outer rails fixedly carried by lateral extension 238 of the members 201 and the inner rails carried by the angle-iron supports 204, as may be seen in FIG. 16. Each set of outer rails 239 are joined, as may be seen in FIG. 17, by a plurality of hinged rail segments 236, which also are pivotally joined together, and extend throughout substantially 180° of curvature at the ends of the rails 239. These segments also function as brake band lining segments secured to their inner faces. FIG. 17 also shows a plurality of brake segments adjustment means 241, each comprising a screw-threaded bolt 242, compression coil spring 243, adjustment nut 244 and support brackets 245, carried by the structural angle-iron supports 204 (as may be seen in FIG. 16).

The braking means prevents the hinged apron assemblies 226 from running ahead while being pulled down around the rear end of the load compartment.

Rail cleaning means 250 is shown in FIG. 20, each preferably comprising a sheet of substantially flat flexible sheet material, such as web-reinforced rubber, hinged about the leading wheel pin of the hinged apron assembly 226 and the leading edge of the shoe of the sheet sliding between the rails 239 and 237. The means 250 is constructed so that, as the shoe wears down and is not immediately replaced, there will be provided a sort of runner, without a sharp edge which edge would be apt to catch on the rail joints.

The conveying and discharge means 225 also includes flexible flight belts 251, like the belts 100 of the means E, whereby the excavated or removed material is initially dumped into a load compartment 255, within the machine housing, defined by the wall members 201, together with the upper reach of the internally mounted flight conveyor 256, of the final discharge means which extends over the bottom of the load compartment 255 and is rotatably mounted on a head sprocket and shaft assembly 258, and on a corresponding rail sprocket and shaft assembly. The transverse flight 259 are positioned only along the bottom and ends when the machine is being loaded.

A discharge gate 257 is provided and differs only from the gate of the means E in that the sides thereof encompass the exterior of the load compartment side walls.

The use of the barrier means 118 of the self-loading means E is also applicable to the self-loading means G, and the barrier means of the self-loading means G function in the same plural ways as in the case of the self-loading means E.

What is claimed is:

1. Self-loading means for a material removing machine having a frame including a removed-material receiving end and a removed-material discharge end, and two longitudinal structural side frame members facing one another and defining an elongate space between them, said self-loading means being for material removed by said machine, and said self-loading means having removed-material conveying and discharge means including a substantially smooth surfaced pulley rotatably supported by said members and extending axially transversely across said space, sprocket wheels within said space and rotatably supported by said members and disposed closely adjacent thereto, endless sprocket chains trained over said sprocket wheels and extending longitudinally of said space and having chain portions adjacent said pulley, flight drag means to urge removed material through said space and to scrape removed material from said pulley, comprising a flight member carried by said chains and having a lip portion extending across said space and movable with movement of said chains over portions of the periphery of said pulley.

2. Self-loading means according to claim 1 characterized in that said flight member is substantially L-shaped in transverse section with said lip extending toward and in contact with said periphery.

3. Self-loading means for a material removing machine having a frame including a removed-material receiving end and a removed-material discharge end, and two longitudinal structural side frame members facing one another and defining an elongate space between them, said self-loading means being for material removed by said machine, and said self-loading means having removed-material conveying and discharge means including a substantially smooth surfaced pulley rotatably supported by said members and extending axially transversely across said space, sprocket wheels within said space and rotatably supported by said members and disposed closely adjacent thereto, endless sprocket chains trained over said sprocket wheels and extending longitudinally of said space and having chain portions adjacent said pulley, flight drag means to urge removed-material through said space and to scrape removed-material from said pulley, comprising a flight member carried by said chains and having a rigid body portion retaining said chains against movement toward each other and a lip portion extending across said space and movable with movement of said chains over portions of the periphery of said pulley.

4. Self-loading means according to claim 3 characterized in that said flight member is substantially L-shaped in transverse section with said lip extending toward and in contact with said periphery.

5. Self-loading means for a material removing machine having a frame including a removed-material receiving end and a removed-material discharge end, and two longitudinal structural side frame members facing one another and defining an elongate space between them, said self-loading means being for material removed by said machine, and said self-loading means having removed-material conveying and discharge means including a substantially smooth surfaced pulley rotatably supported by said members and extending axially transversely across said space, sprocket wheels within said space and rotatably supported by said members and disposed closely adjacent thereto, endless sprocket chains trained over said sprocket wheels and extending longitudinally of said space and having chain portions adjacent said pulley, flight drag means to urge removed material through said spaces and to scrape removed material from said pulley, comprising a flight member carried by said chains and having a lip portion extending across said space and movable with movement of said chains over portions of the periphery of said pulley, said self-loading means also including a load compartment for receiving removed material from said removed-material conveying and discharge means, said load compartment having an endless conveyor extending across said space, and a partition wall extending across said space and diagonally downward from said pulley toward said endless conveyor.

6. Self-loading means according to claim 5 characterized in that said partition wall is provided with a lip extending to said periphery and out of contact with said lip portion of said flight member, and constructed and arranged to guide removed material from said pulley onto said partition wall.

7. Self-loading means for a material removing machine having a frame including a removed-material receiving end and a removed-material discharge end, and two longitudinal structural side frame members facing one another and defining an elongate space between them, said self-loading means being for material removed by said machine, and said self-loading means having removed-material conveying and discharge means including a substantially smooth surfaced pulley rotatably supported by said members and extending axially transversely across said space, sprocket wheels within said space and rotatably supported by said members and disposed closely adjacent thereto, endless sprocket chains trained over said sprocket wheels and extending longitudinally of said space and having chain portions adjacent said pulley, flight drag means to urge removed material through said space and to scrape removed material from said pulley, comprising a flight member carried by said chains and having a lip portion extending across said space and movable with movement of said chains over portions of the periphery of said pulley, said self-loading means also including a load compartment for receiving removed material from said removed-material conveying and discharge means, said load compartment having an endless conveyor with its axis of rotation substantially parallel with the axes of rotation of said pulley and sprocket wheels and extending across said space, and a partition wall extending across said space and diagonally downwardly from said pulley toward said endless conveyor.

8. Self-loading means for a material removing machine having a frame including a removed-material receiving end and a removed-material discharge end and two longitudinal structural side frame members facing one another and defining an elongate space between them, with material removing means and means for operating said material removing means, including a pair of runs of first chains rotatable along the inner faces of said members and inwardly of the edges thereof; said self loading means for material removed by said material removing means upon rotation of said runs of first chains including a substantially smooth surfaced pulley rotatably supported by said members and extending axially transversely across said space, sprocket wheels within said space and rotatably supported by said members and disposed closely adjacent thereto, runs of endless sprocket chains trained over said sprocket wheels and extending longtudinally of said space, flight drag means to urge removed material through said space and to scrape removed material from said pulley, comprising a flight member carried by said endless sprocket chains and having a lip portion extending across said endless sprocket chains space and movable with movement of said chains, over portions of the periphery of said pulley, a flight belt carried at one end thereof by the first-named chains and carried at the other end thereof by said flight member, said pulley and sprocket wheels being disposed remote from the runs of a portion of the first-named chains and adjacent the runs of the other portions of said first chains.

9. Self-loading means according to claim 8 characterized in that the connections of said flight belt to the first-named chains and said flight member are hinge connections.

References Cited by the Examiner
UNITED STATES PATENTS

| | | | |
|---|---|---|---|
| 287,563 | 10/83 | Morton | 37—190 |
| 328,697 | 10/85 | Marquis | 37—102 |
| 852,131 | 4/07 | Martin | 37—7 |
| 981,652 | 1/11 | D'Homergue | 37—7 |
| 1,501,621 | 7/24 | Ronning | 37—80 |
| 1,605,181 | 11/26 | Frickey | 198—229 |
| 2,787,366 | 4/57 | Sykokis | 198—137 |
| 2,945,581 | 7/60 | Clendenin | 198—229 |
| 2,956,668 | 10/60 | Fioravarti | 198—153 |
| 3,033,394 | 5/62 | Kashergen. | |
| 3,049,823 | 8/62 | Spaulding | 37—190 |
| 3,068,597 | 12/62 | Spaulding | 37—189 |

BENJAMIN HERSH, *Primary Examiner.*

UNITED STATES PATENT OFFICE
CERTIFICATE OF CORRECTION

Patent No. 3,187,915 June 8, 1965

Robert V. Spalding

It is hereby certified that error appears in the above numbered patent requiring correction and that the said Letters Patent should read as corrected below.

Column 4, line 54, for "chain" read -- chains --; column 9, line 44, strike out "a"; column 11, line 14, for "spaces" read -- space --; column 12, line 27, strike out "endless sprocket chains"; line 28, before "chains" insert -- endless sprocket --.

Signed and sealed this 7th day of December 1965.

(SEAL)
Attest:

ERNEST W. SWIDER
Attesting Officer

EDWARD J. BRENNER
Commissioner of Patents